Aug. 15, 1967   C. G. TERMONT ETAL   3,335,884
POWER LOADER

Filed Oct. 21, 1965   2 Sheets-Sheet 1

INVENTORS
CHARLES G. TERMONT &
ROBERT W. BRITTAIN
BY *William A. Murray*

ATTORNEY

Aug. 15, 1967    C. G. TERMONT ETAL    3,335,884
POWER LOADER

Filed Oct. 21, 1965    2 Sheets-Sheet 2

INVENTORS
CHARLES G. TERMONT &
ROBERT W. BRITTAIN
BY William A. Murray
ATTORNEY

United States Patent Office 3,335,884
Patented Aug. 15, 1967

3,335,884
POWER LOADER
Charles G. Termont, Dubuque, Iowa, and Robert W. Brittain, Rock Island, Ill., assignors to Deere & Company, Moline, Ill., a corporation of Delaware
Filed Oct. 21, 1965, Ser. No. 499,768
5 Claims. (Cl. 214—140)

This invention relates to a tractor-mounted power loader. Still more particularly this invention relates to the post construction that supports the lift arms of the power loader on the tractor frame.

In the past it has been conventional to provide power loaders mounted on a tractor that included a pair of upright posts on opposite sides of the tractor body and rigidly connected to the tractor frame. The upper ends of the post were often rigidly connected so as to give transverse rigidity to the upright post structure. The upper ends of the post also carried for vertical movement the respective fore-and-aft extending lift arms that carried the bucket. The transverse beam that connected the upper ends of the post normally was disposed above the level of the tractor engine and in many cases interfered with the view of the operator. Often the post construction was such that a transverse beam was not required. However, such construction had to be of such large and bulky nature that it was often difficult to find sufficient space to mount it on the tractor.

With the above in mind, it is the primary object of the invention to provide an upright H-shaped post structure having opposite upright post portions disposed on opposite sides of the tractor and interconnected by a transverse horizontal rigid structure positioned adjacent to the upper rear corner of the engine portion of the tractor. In the particular structure herein to be disclosed and described, the transverse beam portion will have a faced surface positioned forwardly of the operator's station on the tractor and the various parts making up an instrument panel of a tractor will be on the faced surface. Consequently, the structure forming the faced surface or instrument panel will likewise operate as a transverse structural beam between the upright posts.

Other objects and advantages of the present invention will become apparent to those skilled in the art as the nature of the invention is better understood from the following description and as shown in the accompanying drawings.

Figure 1:
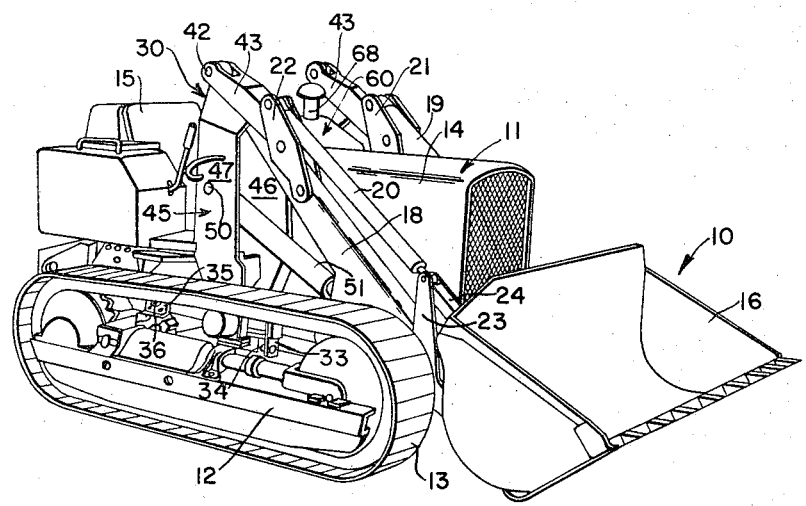
FIG. 1 is a front and side perspective view of a tractor and a loader mounted thereon.

A power loader, indicated in its entirety by the reference numeral 10, is supported on a tractor 11 having a fore-and-aft extending main frame 12 that carries a pair of rotating tracks 13 on opposite sides of the tractor. The tractor also has an engine portion, such being indicated in its entirety by the reference numeral 14, and an operator's station indicated by the location of a tractor seat 15.

The loader 10 includes a loader bucket 16 supported in conventional manner on the forward ends of a pair of fore-and-aft extending lift arms 17, 18 on the left- and right-hand sides of the tractor body. The bucket 16 is tilted relative to the forward ends of the lift arms 17, 18 by a pair of tilt cylinders 19, 20. The latter cylinders extend between rear upright levers 21, 22 and forward arms or levers, one of which is shown at 23 at the forward end of the respective lift arms 17, 18. The upper end of the lever 23 is also connected to the bucket by means of a link 24. A similar linkage and lever arrangement is provided on the left lift arm 17 adjacent the rear side of the bucket.

Both lift arms 17, 18 are supported on the tractor by a main H-shaped post structure 30 that straddles the tractor adjacent the rear end of the engine portion 14. The H-shaped post structure includes a pair of vertical side posts 31, 32 positioned on the left and right sides respectively of the tractor. Each of the respective posts 31, 32 is provided at its lower end with a downwardly opening yoke 33 that receives a fore-and-aft extending pin 34 for purposes of mounting that end on the respective side frames 12 of the tractor. Also provided on the lower end of the respective posts 31, 32 are rear plate structures 35 that receive transverse pins shown only partially at 36 in FIG. 1 that further support the respective posts 31, 32 on the tractor frame 12. A horizontal metal pad 37 is provided above the plate structure and serves as a step plate for permitting an operator to enter into the area of operation on the tractor.

Each of the posts 31, 32 is provided with an upper end 39 having a pair of transverse horizontal pivots 40, 41. The forward lower pivots 41 receive pivot pins, not shown, that connect the rear ends of the lift arms 17, 18 to the post. Pivot pins 42 are provided through the upper rear pivots 40 and connect to links 43 that extend forwardly and are connected to midportions of the respective levers 21, 22.

Figure 5:
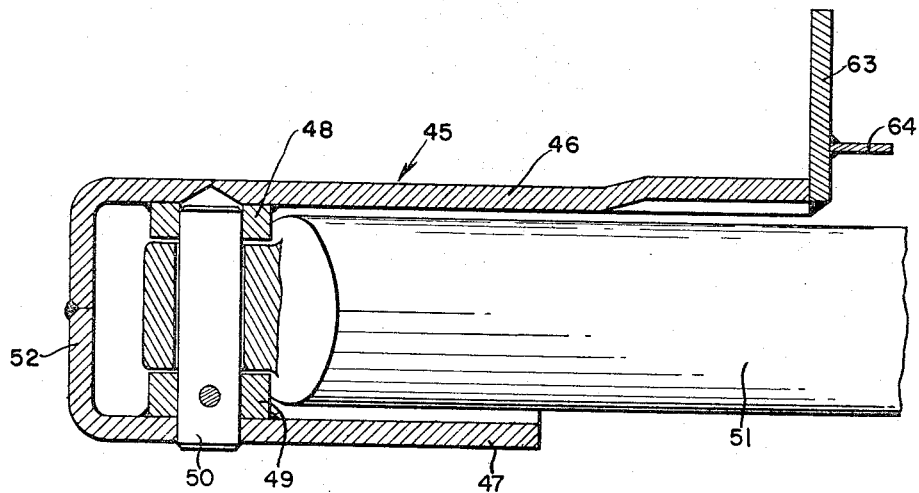
FIG. 5 is an enlarged sectional view taken substantially along the line 5—5 of FIG. 2.
Figure 3:
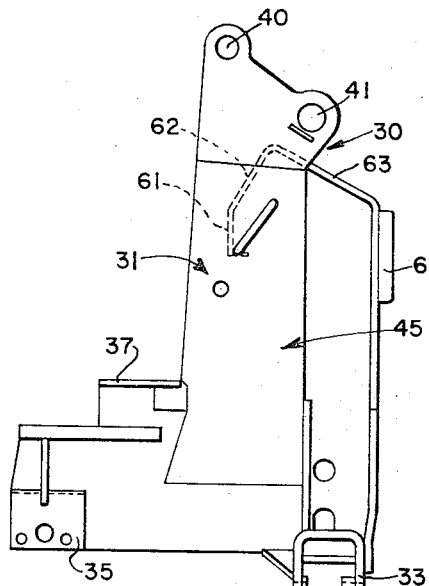
FIG. 3 is a side view of the post structure for the power loader.
Figure 4:
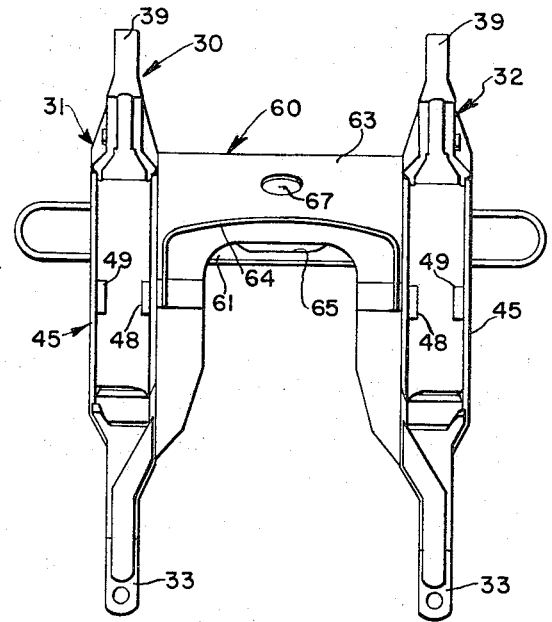
FIG. 4 is a front view of the structure shown in FIG. 3.

Each of the posts 31, 32 has upright forwardly opening and rearwardly closed U-shaped central portion 45 composed of an inner upright wall 46 and an outer upright wall 47 that are transversely spaced apart and are joined by a bight portion 52 that extends across the rear ends of the respective walls 46, 47. Projecting inwardly from the respective walls 46, 47 are lined bosses 48, 49 that receive a transverse pivot pin 50 on which is mounted the rear end of a lift arm cylinder 51. The lift arm cylinder 51 is provided on each side of the tractor and operates to raise and lower the respective lift arms 17, 18. As may be seen from viewing FIG. 5, the transverse pivot pin 50 is closely adjacent the rear upright wall 52 of the central section and consequently the cylinder 51 is afforded considerable protection by the amount it is recessed within the upright posts. Also, by being open forwardly, and having the mounting or pivot pin 50 closely adjacent the rear wall, there is a considerable space saving involved so that a relatively long cylinder 51 may be utilized in raising the lift arms 17, 18 a relatively large amount.

Figure 2:
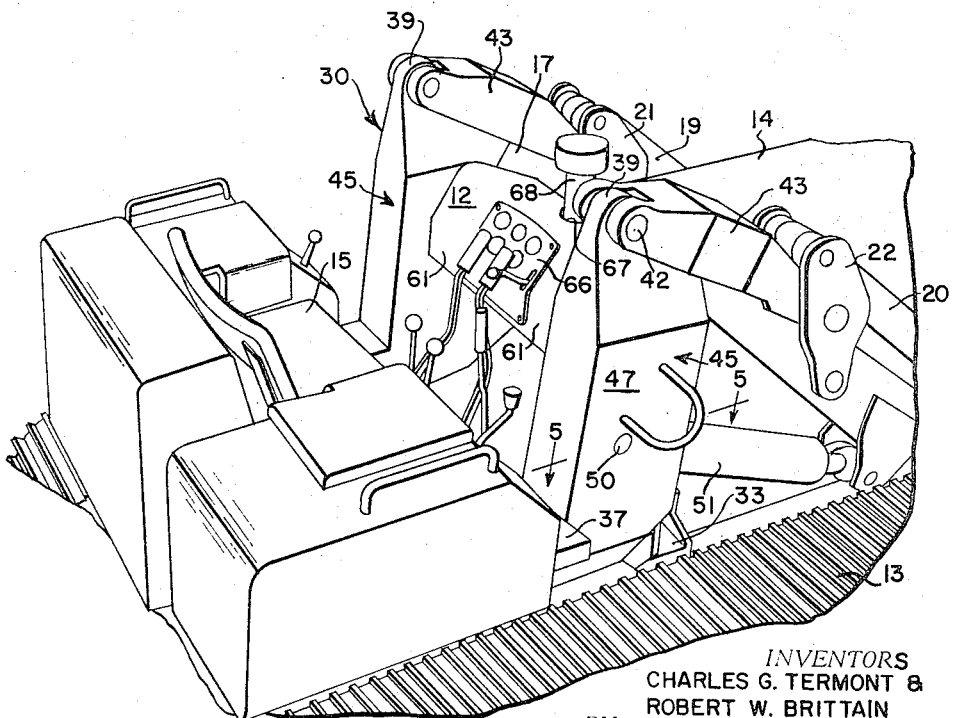
FIG. 2 is an overhead and side perspective view of a portion of the tractor and loader and showing the area about the operator's station on the tractor.

The H-shaped post structure 30 further includes a transverse horizontal portion 60 that extends across and is rigidly connected to the inner walls 46 of the central portions 45 of each of the posts 31, 32. As may be seen from viewing FIGS. 1 and 2, the transverse bight portion 60 is positioned closely adjacent the upper rear corner of the engine portion 14. The bight portion 60 is composed of an upright rear plate portion 61, and an upwardly and forwardly inclined faced portion 62 that extends to a crown and from thence downwardly and forwardly as shown at 63. The forward side of the portion 60 includes an arcuate shaped flange 64 that complements the hood cross section of the engine portion 14. The arcuate portion 64 normally overlies the rear upper edge of the hood to give a rather continuous appearance between the hood and transverse portion 60.

The rear portions 61, 62 are provided with a rectangular shaped opening 65 that receives an instrument panel 66 with the conventional type dials that indicate the various operation functions of the tractor. The forward plate portion 63 of the transverse portion 60 has a central opening 67 therein for passing an upright pipe 68 upwardly. In the particular instance the pipe 68 is part of an air cleaner. However, other parts of a tractor could project through the plate 63 in a similar manner. The point desired to be emphasized herein is that the transverse structure or portion 60 is utilized not only as a structural reinforcement between the posts 31, 32 but also as a part of the tractor.

While only one form of the invention has been shown, it should be recognized that other forms and variations thereof will occur to those skilled in the art. Therefore, while the preferred form was shown for the purpose of clearly and concisely illustrating the principle of the invention, it should be understood there was no intention to limit or narrow the invention beyond the broad concepts set forth in the appended claims.

What is claimed is:

1. A post structure for a tractor-mounted power loader having a pair of forwardly extending lift arms, and the tractor having a fore-and-aft extending main frame with a forwardly positioned engine portion having a hood thereon, comprising: an upright H-shaped rigid structure straddling the tractor adjacent the rear end of the engine portion and including a pair of vertical side posts positioned on opposite sides of the tractor and having lower ends adapted for connection to opposite sides of the main frame, upper ends adapted for pivotal connection to the lift arms, and further having U-shaped forwardly opening and rearwardly closed central portions with each central portion having transversely spaced side walls, the H-shaped structure further having a transverse horizontal portion rigidly interconnecting the posts between the upper and lower ends and disposed closely adjacent the upper rear corner of the engine portion, the transverse horizontal portion further having a forward horizontal lip portion conforming to the shape of and engaging the hood of the engine portion, a rearwardly facing instrument panel on the transverse horizontal portion for indicating the operational characteristics of the tractor, and transverse horizontal pivot means extending between the opposed sides of the side walls of each post and adapted to support internally of the central portions the ends of lift cylinders for raising and lowering the respective lift arms.

2. A post structure for a tractor-mounted power loader having a pair of forwardly extending lift arms, and the tractor having a fore-and-aft extending main frame with a forwardly positioned engine portion, comprising: an upright H-shaped, rigid structure straddling the tractor adjacent the rear end of the engine portion and including a pair of vertical side posts positioned on opposite sides of the tractor and having lower ends adapted for connection to opposite sides of the main frame, upper ends adapted for pivotal connection to the lift arms, the H-shaped structure further having a transverse horizontal portion rigidly interconnecting the posts between the upper and lower ends and disposed closely adjacent to and in general rearward prolongation with the upper rear corner of the engine portion, the horizontal portion further having an instrument panel means thereon facing rearwardly for indicating the operational characteristics of the tractor, and transverse horizontal pivot means on the posts between the upper and lower ends adapted to support the ends of lift cylinders for raising and lowering the respective lift arms.

3. The invention defined in claim 2 in which the engine portion has a hooded top and the transverse portion of the H-shaped frame has a forward edge in contact with and shaped to conform to the upper surface of the hooded top.

4. The invention defined in claim 3 in which the transverse portion is composed of a plate-like structure having a forward section extending rearwardly from the front edge and a rear section extending rearwardly and downwardly from the front section and having a surface facing upwardly and rearwardly and further characterized by the instrument panel means being carried on the rear section.

5. The invention defined in claim 3 in which the transverse portion has aperture means therein for passing vertically extending parts of the engine portion of the tractor therethrough.

References Cited

UNITED STATES PATENTS 2,526,500  10/1950  Pilch  --------------- 214—140
2,815,876  12/1957  Rogers  ----------- 214—780 X HUGO O. SCHULZ, *Primary Examiner.*